A. J MARTIN.
Hay Fork.
No. 79,586. Patented July 7, 1868
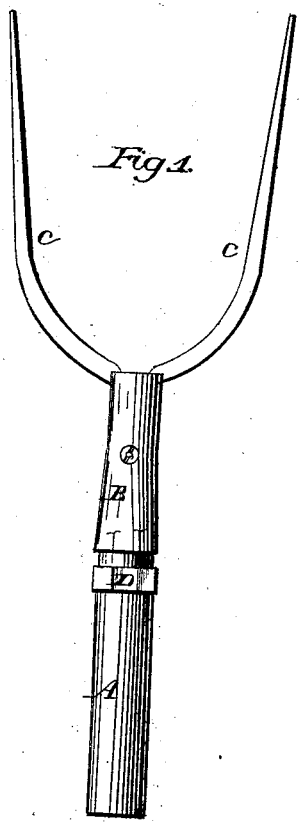
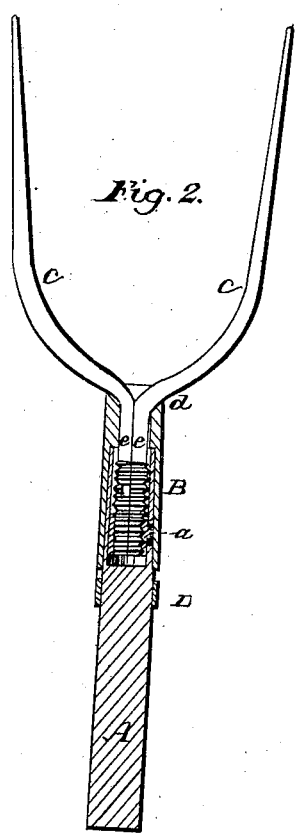
WITNESSES:
INVENTOR:

United States Patent Office.

A. J. MARTIN, OF CATSKILL, NEW YORK.

*Letters Patent No. 79,586, dated July 7, 1868.*

---

IMPROVEMENT IN HAY AND MANURE-FORK.

---

*The Schedule referred to in these Letters Patent and making part of the same.*

---

TO ALL WHOM IT MAY CONCERN:

Be it known that I, A. J. MARTIN, of Catskill, in the county of Greene, and in the State of New York, have invented certain new and useful Improvements in Hay and Manure-Forks; and do hereby declare that the following is a full, clear, and exact description thereof, reference being had to the accompanying drawings, and to the letters of reference marked thereon.

In the annexed drawings, forming part of this specification—

Figure 1 is an outside view and

Figure 2 a sectional view.

The nature of my invention consists in inserting the shank attached to the tines in the bore of the handle in two or more separate and detached parts, so combined that, when in the handle, they shall form a complete and perfect fork; also, in cutting a thread on the shank or shanks in such a manner that, when the parts of the shank are placed together, they shall form a screw on the same, and hold the fork firmly in its place in the handle; and also, in combination with the above, in squaring the end of the ferrule, in such a manner that the handle can be turned with a common wrench, for the purpose of screwing the handle on to the shank of the fork, or removing the same at pleasure, and in introducing through the ferrule a screw or pin, either into or against the shank or shanks, to hold the same firmly in place, and prevent them from turning in the handle.

To enable others skilled in the art to make and use my invention, I will proceed to describe its construction and operation.

In the annexed drawings, A represents the handle, made of suitable material, and of any size required, with a bore through the centre, in the upper part, in which the shanks $e\ e$ of the tines C C are inserted.

B represents the metal ferrule, part of which is over the handle A, and the rest or upper part of the ferrule extends beyond the handle, and is bored for the insertion of the shanks. This bore in the ferrule B may be either of uniform calibre or tapering, so that the shank of the fork or hook, being firmly drawn into the same, may be securely held thereby. There is a cut or slot, $d$, in the top end of the ferrule, which allows a portion of the ferrule to project over the tines C C of the fork, above and below, at the junction thereof, when the shanks $e\ e$ are inserted in the ferrule and handle, and rest in this cut or notch. The lower end of the ferrule B, or any portion thereof, may be squared, or an additional ferrule or ring, D, may be put on the handle, and its surface squared in such a manner that the handle A may be turned with a common wrench, for the purpose of screwing the handle on to the shank of the fork, or removing the same at pleasure.

C C represent two more tines, with their shanks, $e\ e$, so constructed that when the shanks are placed together in immediate contact, the tines shall form a complete and perfect fork. The shanks $e\ e$ are held in position by means of a nut, $b$, in one, and corresponding groove in another, and a thread is cut on them in such a manner that, when placed together, they shall form a screw on the same, as shown in fig. 2, which screw is capable of conveying and holding the fork firmly in the handle, either by the use of an iron nut, $a$, sunk in the handle A, or by screwing directly in the wood, or in both. By such an arrangement of the adjustable tines C C, if one of them is broken, it can be removed, and a duplicate substituted.

A screw or pin, O, may be introduced through the ferrule B, either into or against the shanks, to hold the same more firmly in place, and prevent them from turning in the handle.

Having thus fully described my invention, what I claim as new, and desire to secure by Letters Patent, is—

The combination of the handle A, ferrule B, adjustable tines C C, screw $o$, and nut $a$, substantially as and for the purposes herein set forth.

In testimony that I claim the foregoing, I have hereunto set my hand and seal, this 27th day of April, 1868.

A. J. MARTIN. [L. S.]

Witnesses:
WILLIAM SALISBURY,
DORR MONROE.